2,860,114

OIL-MODIFIED AMINE TYPE ALKYD RESIN PROVIDING THIXOTROPIC PROPERTIES TO HYDROCARBON SOLUTIONS THEREOF

Benjamin A. Bolton, Hammond, and Richard E. Van Strien, Griffith, Ind., assignors to Standard Oil Company, Chicago, Ill., a corporation of Indiana No Drawing. Application December 16, 1955
Serial No. 553,407

4 Claims. (Cl. 260—22)

This invention relates to oil-modified alkyd resins which are suitable for protective coatings. More particularly the invention relates to an oil-modified alkyd resin which provides thixotropic properties to the liquid coating material.

Very recently there has come into prominence in the interior decorating field the so-called jellied paints. These paints are oil-modified alkyd resin compositions containing an agent which imparts a body to the paint, which body is readily broken by pressure of brush or roller. These jellied paints are also spoken of as paints having thixotropic properties. Because of the do-it-yourself trend, the jellied paints are of considerable interest to the do-it-yourself man since they reduce the dripping and splashing tendencies of the paint and also decrease runs and sags of the paint on the surface coated.

An object of the invention is an oil-modified alkyd resin providing thixotropic properties to a surface coating composition containing the resin. Another object is a surface coating composition having thixotropic properties. Other objects will become apparent in the course of the detailed description.

The oil-modified alkyd resin of the invention is made by (1) reacting a polyhydric alcohol and a member of the class consisting of vegetable oil, marine oil and fatty acids in relative amounts such that essentially only one hydroxyl group in said alcohol remains unreacted, (2) reacting in essentially equi-molar amounts the product of 1 and an acid selected from the class consisting of benzene tricarboxylic acid and anhydrides to form a product containing essentially two unreacted carboxyl groups and (3) under polyester condensation reaction conditions producing an alkyd resin by reacting the product of 2 with an alkylene diamine containing from 2 to 6 carbon atoms, wherein said diamine is charged in an amount from about 5 to about 20 mole percent in excess of the stoichiometric requirement.

The first stage of the process of the invention involves the alcoholysis reaction of a polyhydric alcohol and a vegetable oil, marine oil, fatty acid or mixture thereof. The polyhydric alcohol may be any one of the alcohols which contain at least two hydroxyl groups. Examples of typical polyhydric alcohols which have been used in the preparation of alkyd resins and may be used herein are glycerol, trimethylolethane, pentaerythritol, dipentaerythritol, sorbitol and mannitol. In addition to these polyhydric alcohols, diols may be used, such as ethylene glycol, propylene glycol, diethylene glycol, dipropylene glycol, tetraethylene glycol, etc. Glycerol is preferred as the polyhydric alcohol for use in the first stage of the process.

The polyhydric alcohol is reacted with one of the oils or fatty acids conventionally used in oil-modified alkyd resin production. The fatty acids utilized may be a mixture of fatty acids derived from one of the oils or may be a single one of the various fatty acids. The vegetable oils which are commonly used for this purpose are: linseed, soybean, tung, castor, dehydrated castor, oiticica, cocoanut, cottonseed, rapeseed, perilla, corn, poppyseed, tall, safflower. The marine oils commonly used are: herring, sardine and menhaden.

These vegetable and marine oils are often classified as drying, semi-drying and non-drying oils. Linseed oil is an example of a commonly used drying oil; soybean oil is a typical semi-drying oil; and cottonseed is an example of a non-drying oil. The oils may be processed to obtain a mixture of fatty acids which are designated by the name of the source oil. For example, soya fatty acids are derived from soybean oil. The more or less pure individual fatty acids may also be utilized in the preparation of the composition. Commonly utilized fatty acids are: capric, lauric, myristic, palmitic, stearic, behanic, oleic, linoleic, linolenic, ricinoleic, erucic.

The first stage reaction is carried out utilizing a relative amount of alcohol and oil such that all but one of the hydroxyl groups of the alcohol are reacted; or, conversely, relative amounts such that essentially only one hydroxyl group in the alcohol remains unreacted. For example, one mole of glycerol is reacted with two moles of soya fatty acid to produce one mole of a diglyceride.

The reaction between the alcohol and the oil in the first stage is carried out under typical alcoholysis conditions. For example, the reaction is carried on at a temperature between about 300° F. and 500° F. under an inert atmosphere for a time such that the desired methanol compatibility is reached.

After the alcoholysis reaction of the first stage has been completed, a benzene tricarboxylic acid or anhydride is added to the product of the alcoholysis reaction. The benzene tricarboxylic acids are trimesic, trimellitic, and hemimellitic. It is preferred to use either the trimellitic acid or the trimellitic anhydride. The acid or anhydride and the alcoholysis reaction product are charged in about equimolar amounts, in order to produce a reaction product which contains two unreacted carboxyl groups on the acid molecule.

The second stage reaction is carried out under conditions of time and temperature such as are used in conventional alkyd resin production, although higher temperatures may be used. For example, the second stage reaction may be carried out at a temperature of between about 400° F. and about 500° F. The heating of the two reactants is carried on until a single phase homogeneous solution has been obtained. Preferably the reaction is carried on for a period of a few minutes longer than that needed to obtain a homogeneous solution.

The oil-modified alkyd resin product is obtained by reacting, under polyester condensation conditions, the product of the second stage of the process with an alkylene diamine containing from 2 to 6 carbon atoms. Examples of the alkylene diamines usable herein are ethylene diamine, propylene diamine and hexamethylene diamine. Ethylene diamine is preferred.

The alkylene polyamine is utilized in the third stage in an amount from about 5 to about 20 mole percent in excess of the theoretical stoichiometric requirement for the reaction. More usually, the excess is about 15 mole percent.

The third stage of reaction is carried out under typical polyester condensation reactions. For example, the reaction is carried out at a temperature between about 400° F. and 500° F. The reaction is carried on until the reaction product has the desired viscosity and also the desired acid number.

A liquid coating composition possessing thixotropic properties is obtained by mixing the oil-modified alkyd resin of the invention with a hydrocarbon solvent. The hydrocarbon solvent may be any one of those conventionally used in the protective coating art such as mineral spirits, paint thinner, VM&P naphtha and aromatic solvent. Although the minimum amount will be dependent somewhat upon the type of solvent used, in general, a composition consisting of about 30 weight percent of alkyd resin and the remainder of solvent will possess significant amount of thixotropy. The use of more than this amount of resin results in a composition having more body. Pigmented compositions may be made by adding various pigments to the vehicle consisting of resin and hydrocarbon solvent. The presence of pigment has some effect on the thixotropic characteristics of the paint composition and the relative proportions of resin and solvent in the vehicle will have to be adjusted in order to obtain a liquid coating composition having the desired thixotropic properties.

The process of the instant application and the products made therefrom are illustrated by the following example.

*Example*

In the first stage of the process, 56 grams of soya fatty acids and 9.2 grams of glycerol were added to a flask equipped with a motor-driven stirrer, a thermometer and a reflux condenser. Provisions were made for the maintenance of a nitrogen atmosphere in the flask. The oil and glycerol were heated at 430° F., using 0.1 gram of calcium hydroxide as alcoholysis catalyst, for 60 minutes when the reaction was complete.

The second stage of the process was carried out by adding 21 grams of trimellitic acid to the flask. The contents of the flask were agitated at a temperature of about 430° F. for one hour. This time was a few minutes in excess of that time required for the disappearance of the separate phases of alcoholysis reaction product and trimellitic acid and the appearance of a single homogeneous solution in the flask.

The contents of the flask were permitted to cool to 285° F. where 6.3 grams of ethylene diamine were added. In the third stage, the temperature was gradually raised over a period of 3 hours to 405° F. and over another 3 hour period to 450° F.

The reaction product was diluted with mineral spirits to give a solution containing 33% solids, i. e., 33 weight percent of the oil-modified alkyl resin product of the third stage. The acid number (mg. KOH/100 g.) of the solution was 17.3.

The solution of resin and mineral spirits formed a gel-type material. When the container with the gen was shaken by hand rapidly, the gel broke to form a low viscosity liquid. Almost immediately after the shaking was stopped, the gel structure reformed.

Thus having described the invention, what is claimed is:

1. An alkyd resin prepared by (I) reacting in an inert atmosphere and in the presence of an alcoholysis catalyst glycerol and soya fatty acids in relative amounts such that essentially only one hydroxyl group in said glycerol is unreacted at a temperature between about 300° F. and 500° F. until the desired methanol compatibility is obtained, (II) reacting in essentially equi-molar amounts the product of (I) and tirmellitic acid to form a second product containing essentially two unreacted carboxy groups on the acid molecule at a temperature between about 400° F. and 500° F. until a single phase homogneous solution is obtained and (III) reacting the product of (II) with ethylene diamine wherein said diamine is charged in an amount from about 5 to about 20 mol percent in excess of stoichiometric requirement at a temperature between about 400° F. and 500° F. until the desired viscosity and acid number is obtained.

2. An alkyd resin prepared by (I) reacting in an inert atmosphere and in the presence of an alcoholysis catalyst about 9 parts by weight of glycerol and about 56 parts by weight of soya fatty acids at a temperature of about 430° F. until the desired methanol compatibility is reached the reaction product is characterized by the presence of essentially only 1 unreacted hydroxyl group in said glycerol, (II) reacting the product of (I) with about 21 parts by weight of trimellitic acid at a temperature of about 430° F. until a single homogeneous solution is obtained the reaction product being characterized by essentially two unreacted carboxyl groups on the acid molecule and (III) reacting the product of (II) with about 6 parts by weight of ethylene diamine at a temperature between about 400° F. and 450° F. until an acid number of about 17 is obtained.

3. A composition comprising (*a*) a hydrocarbon solvent and (*b*) at least about 30 weight percent, based on solvent and resin, of an oil-modified alkyd resin prepared by the process of claim 1, which composition is characterized by thixotropic properties.

4. A composition comprising (*a*) pigment solids, (*b*) hydrocarbon solvent and (*c*) an oil-modified alkyd resin prepared by the process of claim 1, in an amount sufficient to impart thixotropic properties to said composition.

References Cited in the file of this patent

UNITED STATES PATENTS 2,048,778    Brubaker et al. _____ July 28, 1936

UNITED STATES PATENT OFFICE
CERTIFICATE OF CORRECTION

Patent No. 2,860,114 November 11, 1958

Benjamin A. Bolton et al.

It is hereby certified that error appears in the printed specification of the above numbered patent requiring correction and that the said Letters Patent should read as corrected below.

Column 4, line 10, for "tirmellitic" read -- trimellitic --; line 11, for "carboxy" read -- carboxyl --.

Signed and sealed this 3rd day of February 1959.

(SEAL)
Attest:
KARL H. AXLINE
Attesting Officer

ROBERT C. WATSON
Commissioner of Patents